United States Patent Office 2,933,540
Patented Apr. 19, 1960

2,933,540

BIS-(ISOPROPYLARYL)METHANE

Arthur R. Lyding, New Haven, Conn., assignor to Olin Mathieson Chemical Corporation, a corporation of Virginia No Drawing. Application January 14, 1958
Serial No. 708,750

2 Claims. (Cl. 260—668)

This invention relates to novel bis-(isopropylaryl)-methane hydrocarbons and particularly to bis-(isopropylphenyl)methane, more simply termed dicumylmethane, especially isomeric mixtures of dicumylmethanes, having highly advantageous physical and chemical properties as compared with previously known bis-(alkaryl)methane hydrocarbons.

This application is a continuation-in-part of my co-pending application Serial Number 598,541, filed July 18, 1956.

The principal object of this invention is the provision of novel bis-(isopropylaryl)methane hydrocarbons, particularly dicumylmethane. Further objects include the provision of isomeric mixtures of dicumylmethane, and particularly of p,p'-dicumylmethane.

In accordance with this invention, novel dicumylmethanes have been prepared successfully and have been found to display unexpectedly favorable physical and chemical properties, such that these new compounds are exceptionally versatile.

The novel compounds of the invention are most readily prepared by the condensation of cumene (isopropylbenzene) with formaldehyde in the presence of concentrated sulfuric acid or other acidic condensing agent and, if desired, of a solvent, such as methanol, for the cumene.

The resulting dicumylmethane has the following structure:

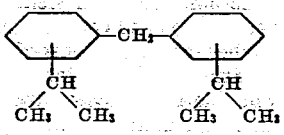

The preparation of the novel dicumylmethane is illustrated in the following specific examples:

EXAMPLE 1

*Preparation of isomeric mixture of dicumylmethane*

30 g. of methanol and 190 g. of concentrated sulfuric acid were mixed in a one liter, three-necked flask while controlling the temperature below 20° C. The flask was equipped with stirrer, condenser and dropping funnel. 125 g. of cumene (1.04 moles) was added and finally 20.3 g. of formalin (36.4%, 0.245 mole) was added over a two hour period while controlling the temperature between 35 and 40° C. The reaction mixture was then stirred for an additional two hours at the same temperature. The mixture was transferred to a separatory funnel and allowed to separate overnight. The organic layer was washed with three 45 ml. portions of 7% sodium carbonate and then with three 50 ml. portions of water. The organic layer was dried over $K_2CO_3$ and filtered.

The liquid was distilled. Unchanged cumene, weighing 49 grams was recovered at 65° C./30 mm. An intermediate cut was obtained which boiled between 126 and 128° C. at a pressure of 0.5 mm. of mercury ($N_d^{26}$=1.5421) and weighed 4.3 grams. The product, weighing 36.5 grams then distilled at 128 to 132° C. at a pressure of 0.5 mm. mercury ($N_d^{26}$=1.5412). As the intermediate cut had a refractive index so close to that of the product, they were considered identical and the yield of 40.8 grams was thus calculated to be 66% of the theoretical (based on formaldehyde). Analysis of a heart cut gave C=90.03% and H=9.80%. Theory requires C=90.42% and H=9.59%. The congealing temperature of the mixture was found to be about —40° C.

EXAMPLE 2

A mixture of 125 g. of cumene, 75 g. of concentrated sulfuric acid and 15.4 g. of distilled water was stirred in a reaction vessel equipped with condenser, stirrer, and dropping funnel. While the mixture was maintained at a temperature of 95°–100° C., 0.24 mole of formaldehyde was added gradually over a two hour period in the form of an aqueous solution containing about 36% formaldehyde. Stirring was continued for two more hours at 95° C.–100° C. The mixture was cooled, transferred to a separatory funnel and allowed to stratify. The organic layer was washed four times with 35 ml. portions of 7% sodium carbonate solution, then three times with 50 ml. portions of distilled water, and dried over anhydrous potassium carbonate.

The solution was filtered and subjected to distillation under reduced pressure. Cumene was distilled at 65°–70° C. at a pressure of 30 mm. of mercury. Dicumylmethane was then distilled at temperatures of 126° to 130° C. at a pressure of about 0.5 mm. of mercury, the yield amounting to 37.9 g., 63% of theoretical based on formaldehyde. Index of refraction, $N_d^{26}$, was 1.5423.

EXAMPLE 3

A mixture of 250 g. of cumene, 380 g. of concentrated sulfuric acid and 60 g. of methanol was warmed to 45° C. While the mixture was stirred and maintained at 45° to 50° C., 0.5 mole of formaldehyde was gradually added over two hours as an aqueous solution containing 36% of formaldehyde. The mixture was stirred at 45°–50° C. for an additional 2½ hour period, and was then allowed to separate. The organic layer was washed three times with 50 ml. portions of 7% sodium carbonate solution, twice with 75 ml. portions of 1% sodium chloride solution and then with 75 ml. of distilled water. The solution was then dried over anhydrous potassium carbonate and filtered. On distillation of the filtrate under reduced pressure, cumene was removed and then 89.2 g. of dicumylmethane was obtained at a boiling point of 126° to 132° C. at about 0.5 mm. of mercury pressure, amounting to 70.9% of theoretical yield, based on formaldehyde. Index of refraction, $N_d^{26}$, was 1.5403.

In the preceding examples, the formaldehyde may be replaced in whole or in part by materials capable of furnishing formaldehyde, for example, by a solid polymer of formaldehyde such as paraformaldehyde or by trioxane.

The dicumylmethane product of the above examples has been found to consist mainly of the p,p' isomer

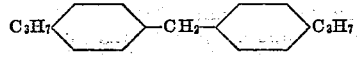

and the balance of other isomers, particularly the o,p' isomer,

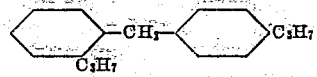

The isomeric products have been found to have the following physical properties:

Boiling point—326°–330° C./760 mm., 128°–132° C./0.5 mm.
Congealing point— —40° C.
Density at 25° C.—0.9320
Refractive index $N_d^{26}$—7.5403–1.5429

Substantially pure p,p'-dicumylmethane was isolated by fractional crystallization of the above isomeric mixtures. The liquid was cooled to a temperature between −30° and −40° C. and allowed to crystallize partially, seeding if necessary with a small amount of the p,p' solid isomer or of the solidified material prepared by storing the isomeric mixture at a temperature below −40° C. for several days. The crystals were separated from the mother liquor by rapid filtration or centrifuging, and if desired, the crystallization process could be repeated. Material purified by crystallization in the above manner was shown to consist of purified p,p'-dicumylmethane by infrared spectroscopic analysis and capable of yielding substantially pure p,p' benzophenone dicarboxylic acid on oxidation. The recrystallized material had a refractive index $N_d^{26}$ of 1.5405 and displayed a melting point of −30° C. and boiling point of 326°–330° C. at atmospheric pressure (760 mm. mercury).

The obtainment of predominantly, the para, para' isomer, substantially over 80%, by the condensation of cumene with formaldehyde is in contrast with the formation of only up to 30 or 40% of such isomer in the condensation of other alkylaromatic compounds, such as toluene, with formaldehyde.

The isomeric product is a clear and colorless liquid of low viscosity having a pungent aromatic odor and characterized by an unusually extended liquid range at normal atmospheric pressure, from −40° C. to about 330° C. Also, the combination of low viscosity and low vapor pressure at ordinary temperatures is unusually favorable.

The novel product is therefore highly advantageous as a heat-exchange fluid, due to the above favorable properties and to its chemical stability and freedom from fractionation difficulties on partial vaporization of the liquid which characterizes mixtures of organic liquids having substantially different boiling points.

The p,p'-dicumylmethane, either pure or in isomeric mixtures, is a versatile solvent of low volatility, being completely miscible with acetic acid, acetone, benzene, toluene, ethyl ether, hexane, chloroform, carbon tetrachloride, methylene chloride, dioxane and ethanol. It is immiscible with water, methanol and ethylene glycol.

An excellent application is as solvent for insecticides such as D.D.T. wherein its low viscosity and surface tension, coupled with slow evaporation at ordinary temperatures, enables the extensive spreading and penetration of the insecticide with resulting enhancement of the desired results.

Illustrating the utility of dicumylmethane as a chemical intermediate, the product of Example 2 was oxidized to form benzophenone dicarboxylic acid in accordance with U.S. 2,806,059, as follows:

A finely dispersed stream of gaseous oxygen was passed through a stirred solution of 9.5 g. of cobaltous acetate tetrahydrate and 50 g. of methyl ethyl ketone in 300 g. of glacial acetic acid contained in a reaction vessel maintained at 90° C. and equipped with a stirrer and reflux condenser. In 60 minutes, the mixture turned green and 37.8 g. of dicumylmethane was added. The mixture was maintained at about 90° C. and the passage of oxygen was continued for 96 hours.

The reaction mixture was filtered hot and the filtered solid was washed with a small volume of concentrated HCl, then to neutrality with water, and finally with a small volume of ethanol. The white solid was dried in an oven and amounted to 13.5 g. of p,p' benzophenone dicarboxylic acid, having a melting point of 360° C.

The reaction mixture filtrate was concentrated to a half of its volume, cooled and the crystalline product was separated by filtration. After being washed with water and dried, 3 g. of o,p' benzophenone dicarboxylic acid were obtained, displaying a melting point of 242°–243° C.

The versatility of dicumylmethane as a chemical intermediate is shown by the fact that it can readily be oxidized by means of gaseous oxygen or air under more moderate conditions than the above to yield a bisphenol and acetone as by-product. For example, 100 g. of dicumylmethane were dispersed in 200 ml. of water containing 2 g. of sodium carbonate, 2 g. of sodium bicarbonate, 0.1 g. of sodium stearate and 0.1 g. of benzoyl peroxide. Oxygen gas was passed into this well-agitated mixture maintained at about 60° C. at a rate of about 30 ml. per minute, and the reaction was allowed to continue for about 48 hours. Sufficient sulfuric acid was added to form a 10% solution and the well-stirred mixture was heated under reflux for 2 to 3 hours. The solution was made alkaline with sodium hydroxide and filtered. The filtrate was carbonated with Dry Ice, the solution being then extracted with ether. After evaporation of the solvent, the bisphenol

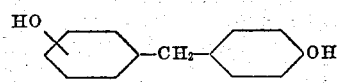

was obtained at a yield corresponding to about 70% of the dicumylmethane which had reacted. Bisphenol of the above composition on reaction with epichlorohydrin yields commercially valuable resins of the epoxy type. Likewise, glycol esters of the benzophenone dicarboxylic acids can be polymerized to yield thermoplastic resins useful for the manufacture of filaments and films.

If the above phenolic oxidation is carried out for about 24 hours, mono-phenol of the composition

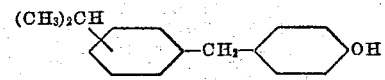

may be isolated which is an antiseptic of excellent spreading and penetrating ability. Substantially pure para derivatives result from the above procedures when the starting material is pure p,p'-dicumylmethane.

Dicumylmethane also serves as intermediate for conversion by means of mixed concentrated nitric and sulfuric acids to valuable nitro compounds which are useful ingredients of explosive compositions. The mono- and di-nitro derivatives can readily be reduced to the corresponding aromatic amines, which yield valuable dye ingredients, on diazotization and coupling, and display properties and enter other reactions typical of aromatic amines.

Likewise, chlorination in accordance with known procedures results in chloro-dicumylmethanes which may be advantageous as chemical intermediates and solvents.

From the foregoing, it will be seen that the novel dicumylmethanes of this invention are valuable compounds, displaying considerable versatility based on the unusually favorable physical properties as well as advantageous chemical reactivity resulting from the unique structure.

I claim:

1. Dicumylmethane consisting essentially of at least 80% of the p,p' isomer and substantially the balance of the o,p' isomer.

2. p,p'-Dicumylmethane.

References Cited in the file of this patent

UNITED STATES PATENTS 2,819,322    Fetterly   ----------------- Jan. 7, 1958

OTHER REFERENCES

Matveen et al.: Chemical Abstracts, volumn 50, page 5192h (1956); abstracted from Kim. Prom. No. 7; October-November 1955.